United States Patent

Hummerich et al.

[11] Patent Number: 6,071,994
[45] Date of Patent: Jun. 6, 2000

[54] FORMALDEHYDE-FREE AQUEOUS BINDERS

[75] Inventors: Rainer Hummerich, Worms; Axel Kistenmacher, Ludwigshafen; Walter Denzinger, Speyer; Gunnar Schornick, Neuleiningen; Bernd Reck, Grünstadt; Manfred Weber, Mannheim, all of Germany

[73] Assignee: BASF Aktiengesellschaft, Ludwigshafen, Germany

[21] Appl. No.: 09/125,113

[22] PCT Filed: Feb. 19, 1997

[86] PCT No.: PCT/EP97/00770

§ 371 Date: Aug. 18, 1998

§ 102(e) Date: Aug. 18, 1998

[87] PCT Pub. No.: WO97/31036

PCT Pub. Date: Aug. 28, 1997

[30] Foreign Application Priority Data

Feb. 21, 1996 [DE] Germany ............ 196 06 394

[51] Int. Cl.⁷ .................................................. C08K 3/00
[52] U.S. Cl. .................... 524/247; 524/249; 524/494
[58] Field of Search .................... 324/247, 249, 324/494

[56] References Cited

U.S. PATENT DOCUMENTS

| | | |
|---|---|---|
| 3,857,803 | 12/1974 | Shenfeld et al. . |
| 4,076,917 | 2/1978 | Swift et al. . |
| 5,340,868 | 8/1994 | Strauss et al. . |
| 5,427,587 | 6/1995 | Arkens et al. . |
| 5,536,766 | 7/1996 | Seyffer et al. ............ 524/100 |
| 5,661,213 | 8/1997 | Arkens et al. ............ 524/555 |

FOREIGN PATENT DOCUMENTS

| | | |
|---|---|---|
| 0 116 930 | 8/1984 | European Pat. Off. . |
| 0 445 578 | 9/1991 | European Pat. Off. . |
| 0 583 086 | 2/1994 | European Pat. Off. . |
| 0 651 088 | 10/1994 | European Pat. Off. . |
| 864 151 | 1/1953 | Germany . |
| 17 20 712 | 7/1971 | Germany . |
| 22 14 450 | 10/1972 | Germany . |
| 23 57 951 | 5/1975 | Germany . |
| 44 08 688 | 9/1995 | Germany . |

OTHER PUBLICATIONS

Patent Abstracts of Japan, vol. 014, No.220, May 10, 1990, JP Publ. No. 02 051531, Feb. 21, 1990, Appl. No.63200120, Aug. 12, 1988, Koinuma Yasuyoshi, et al, Title: Water-soluble and self-curing polymer and cured product thereof.

Patent Abstracts of Japan, vol. 005, No. 180, Nov. 19, 1981, JP Publ. No. 56 104905, Aug. 21, 1981, Chino yasuyoshi, et al, Title: Production of Novel Modified Resin, Appl. No. 55008500, Jan. 28, 1980.

*Primary Examiner*—Edward J. Cain
*Attorney, Agent, or Firm*—Oblon, Spivak, McClelland, Maier & Neustadt, P.C.

[57] ABSTRACT

Formaldehyde-free aqueous binders comprise

A) a polymer containing from 5 to [lacuna]% by weight of units derived from an ethylenically unsaturated acid anhydride or from an ethylenically unsaturated dicarboxylic acid whose carboxyl groups can form an anhydride group, and B) an alkanolamine having at least two hydroxyl groups.

29 Claims, No Drawings

FORMALDEHYDE-FREE AQUEOUS BINDERS

DESCRIPTION

The present invention relates to formaldehyde-free aqueous binders comprising

A) a free-radically polymerized polymer containing from 5 to 100% by weight of units derived from an ethylenically unsaturated acid anhydride or from an ethylenically unsaturated dicarboxylic acid whose carboxyl groups can form an anhydride group, and B) an alkanolamine having at least two hydroxyl groups, the aqueous binder including less than 1.5% by weight, based on the sum of A)+B), of a phosphorus-containing reaction accelerant.

The present invention further relates to the use of the binders as coatings, impregnants or binders for fiber webs.

The consolidation of sheetlike fibrous structures, or fiber webs, is effected for example purely mechanically by needling or water jet consolidation of a wet- or air-laid web or by chemical consolidation of the webs with a polymeric binder. The binder is generally applied by impregnating, spraying or coating. To enhance the wet strength and heat resistance of the webs, use is frequently made of binders comprising formaldehyde-eliminating crosslinkers. Alternatives to existing binders are sought to avoid formaldehyde emissions.

U.S. Pat. No. 4,076,917 discloses binders comprising carboxylic acid or anhydride polymers and β-hydroxyalkylamides as crosslinkers. The molar ratio of carboxyl groups to hydroxyl groups is preferably 1:1. The disadvantage is the relatively complicated synthesis of the β-hydroxyalkylamides. An appropriate binder is known from U.S. Pat. No. 5,340,868.

EP 445 578 discloses rigid sheets of finely divided materials, for example glass fibers, in which mixtures of high molecular weight polycarboxylic acids and polyhydric alcohols, alkanolamines or polyacid amines act as binders. The disclosed high molecular weight polycarboxylic acids are polyacrylic acid, copolymers of methyl methacrylate/n-butyl acrylate/methacrylic acid and of methyl methacrylate/methacrylic acid. The polyhydric alcohols and alkanolamines disclosed are 2-hydroxymethyl-1,4-butanediol, trimethylolpropane, glycerol, poly(methylmethacrylate-co-hydroxypropyl acrylate), diethanolamine and triethanolamine. Maleic acid is mentioned as a possible comonomer for preparing the high molecular weight polycarboxylic acids.

EP 583 086 discloses formaldehyde-free aqueous binders for producing fiber webs, especially glass fiber webs. These binders require a phosphorus-containing reaction accelerant to provide adequate glass fiber web strengths. The binders comprise a polycarboxylic acid having at least 2 carboxyl groups and optionally also anhydride groups. Polyacrylic acid is used in particular, but copolymers of acrylic acid with maleic anhydride are also disclosed. The binder further comprises a polyol, for example glycerol, bis[N,N-di(β-hydroxyethyl)]adipamide [sic], pentaerythritol, diethylene glycol, ethylene glycol, gluconic acid, β-D-lactose, sucrose, polyvinyl alcohol, diisopropanolamine, 2-(2-aminoethylamino)ethanol, triethanolamine, tris(hydroxymethylamino)methane and diethanolamine. The phosphorus-containing reaction accelerant is stated to be omittable only if a highly reactive polyol is used. β-Hydroxyalkylamides are disclosed as highly reactive polyols.

EP-A 651 088 describes formaldehyde-free aqueous binders for cellulosic substrates. The presence of phosphorus-containing reaction accelerant is mandatory in these binders.

DE 4 408 688 discloses formaldehyde-free binders for fibrous sheet materials, comprising a mixture of polycarboxylic acid and aromatic or cycloaliphatic polyols. Despite a very high drying temperature (230° C.), these binders provide only low wet breaking strength on glass fiber webs.

In addition to existing formaldehyde-free binders, it is always desirable to have further formaldehyde-free binders available as alternatives. For economic reasons it is desirable to consolidate sheetlike fibrous structures at low temperatures within a short time while obtaining good mechanical properties. Suitable binders are safe and do not emit toxic or environmentally harmful reaction products in use. Furthermore, suitable binders ideally consist of readily obtainable, inexpensive components.

It is an object of the present invention to provide such binders.

We have found that this object is achieved by the above-described binders and their use as or in coatings, impregnants and also as binders for fiber webs, especially glass fiber webs.

The aqueous binder of this invention includes a polymer A) containing from 5 to 100% by weight, preferably from 5 to 50% by weight, particularly preferably from 10 to 40% by weight, of units derived from an ethylenically unsaturated acid anhydride or an ethylenically unsaturated dicarboxylic acid whose carboxyl groups are capable of forming an anhydride group (hereinafter referred to as monomer a)).

The acid anhydrides are preferably dicarboxylic anhydrides. Suitable ethylenically unsaturated dicarboxylic acids are generally those having carboxylic acid groups on vicinal carbons. The carboxylic acid groups can also be present in the form of their salts.

Preferred monomers a) are maleic acid or maleic anhydride, itaconic acid, 1,2,3,6-tetrahydrophthalic acid, 1,2,3,6-tetrahydrophthalic anhydride, their alkali metal and ammonium salts or mixtures thereof. Maleic acid and maleic anhydride are particularly preferred.

As well as monomer a), the polymer may additionally contain monomer b).

Suitable monomers b) are for example:

Monoethylenically unsaturated $C_3$–$C_{10}$-monocarboxylic acids, (monomer $b_1$), for example acrylic acid, methacrylic acid, ethylacrylic acid, allylacetic acid, crotonic acid, vinylacetic acid, maleic monoesters such as methyl hydrogen maleate, their mixtures and their alkali metal and ammonium salts.

Linear 1-olefins, branched-chain 1-olefins or cyclic olefins (monomer $b_2$), for example ethene, propene, butene, isobutene, pentene, cyclopentene, hexene, cyclohexene, octene, 2,4,4-trimethyl-1-pentene with or without 2,4,4-trimethyl-2-penten, $C_8$–$C_{10}$-olefin, 1-dodecene, $C_{12}$–$C_{14}$-olefin, octadecene, 1-eicosene ($C_{20}$), $C_{20}$–$C_{24}$-olefin; metallocene-catalytically prepared oligoolefins having a terminal double bond, for example oligopropene, oligohexene and oligooctadecene; cationically polymerized olefins having a high •-olefin content, for example polyisobutene.

Vinyl and allyl alkyl ethers having from 1 to 40 carbon atoms in the alkyl radical, which alkyl radical can carry further substituents such as hydroxyl, amino or dialkylamino or one or more alkoxylate groups (monomer $b_3$), for example methyl vinyl ether, ethyl vinyl ether, propyl vinyl ether, isobutyl vinyl ether, 2-ethylhexyl vinyl ether, vinyl cyclohexyl ether, vinyl-4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and also the corresponding allyl ethers and mixtures thereof.

Acrylamides and alkyl-substituted acrylamides (monomer $b_4$), for example acrylamide, methacrylamide, N-tert-butyliacrylamide, N-methyl(meth)acrylamide.

Sulfo-containing monomers (monomer $b_5$), for example allylsulfonic acid, methallylsulfonic acid, styrenesulfonate, vinylsulfonic acid, allyloxybenzenesulfonic acid, 2-acrylamido-2-methylpropanesulfonic acid and their corresponding alkali metal or ammonium salts or mixtures thereof.

$C_1$–$C_8$-Alkyl or $C_1$–$C_4$-hydroxyalkyl esters of acrylic acid, methacrylic acid or maleic acid, or acrylic, methacrylic or maleic esters of $C_1$–$C_{18}$-alcohols alkoxylated with from 2 to 50 mol of ethylene oxide, propylene oxide, butylene oxide or mixtures thereof (monomer $b_6$), for example methyl (meth)acrylate, ethyl (meth)acrylate, propyl (meth)acrylate, isopropyl (meth)acrylate, butyl (meth)acrylate, hexyl (meth) acrylate, 2-ethylhexyl (meth)acrylate, hydroxyethyl (meth) acrylate, hydroxypropyl (meth)acrylate, 1,4-butanediol monoacrylate, dibutyl maleate, ethyldiglycol acrylate, methylpolyglycol acrylate (11 EO), (meth)acrylic esters of $C_{13}$–$C_{15}$-oxo alcohol reacted with 3,5,7,10 or 30 mol of ethylene oxide, or mixtures thereof.

Alkylaminoalkyl (meth)acrylates or alkylaminoalkyl (meth)acrylamides or quaternization products thereof (monomer $b_7$), for example 2-(N,N-dimethylamino)ethyl (meth)acrylate, 3-(N,N-dimethylamino)propyl (meth) acrylate, 2-(N,N,N-trimethylammonio)ethyl (meth)acrylate chloride, 2-dimethylaminoethyl(meth)acrylamide, 3-dimethylaminopropyl (meth)acrylamide, 3-trimethylammoniopropyl(meth)acrylamide chloride.

Vinyl and allyl esters of $C_1$–$C_{30}$-monocarboxylic acids (monomer $b_8$), for example vinyl formate, vinyl acetate, vinyl propionate, vinyl butyrate, vinyl valerate, vinyl 2-ethylhexanoate, vinyl nonoate [sic], vinyl decanoate, vinyl pivalate, vinyl palmitate, vinyl stearate, vinyl laurate. Examples of further monomers $b_9$ are:

N-vinylformamide, N-vinyl-N-methylformamide, styrene, •-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and mixtures thereof.

As well as monomer a), the polymer can additionally contain from 0 to 95% by weight of monomere b. Preferably, as well as monomer a), the polymer additionally contains monomer b in amounts from 50 to 95, particularly preferably from 60 to 90,% by weight.

Preferred monomers are acrylic acid, methacrylic acid, ethene, propene, butene, isobutene, cyclopentene, methyl vinyl ether, ethyl vinyl ether, acrylamide, 2-acrylamido-2-methylpropanesulfonic acid, vinyl acetate, styrene, butadiene, acrylonitrile and mixtures thereof.

Particular preference is given to acrylic acid, methacrylic acid, ethene, acrylamide, styrene and acrylonitrile and mixtures thereof.

Very particular preference is given to acrylic acid, methacrylic acid and acrylamide and mixtures thereof.

The polymers can be prepared according to customary polymerization processes, for example by mass, emulsion, suspension, dispersion, precipitation or solution polymerization. The polymerization processes mentioned are preferably carried out in the absence of oxygen, preferably in a stream of nitrogen. By whichever method the polymerization is carried out it is carried out in customary equipment, for example stirred tanks, stirred tank cascades, autoclaves, tubular reactors and kneaders. Preference is given to using the method of solution, emulsion, precipitation or suspension polymerization. The methods of solution and emulsion polymerization are particularly preferred. The polymerization can be carried out in solvents or diluents, for example toluene, o-xylene, p-xylene, cumene, chlorobenzene, ethylbenzene, technical-grade mixtures of alkylaromatics, cyclohexane, technical-grade aliphatics mixtures, acetone, cyclohexanone, tetrahydrofuran, dioxane, glycols and glycol derivatives, polyalkylene glycols and derivatives thereof, diethyl ether, tert-butyl methyl ether, methyl acetate, isopropanol, ethanol, water or mixtures such as, for example, isopropanol/water mixtures. The preferred solvent or diluent is water with or without proportions of up to 60% by weight of alcohols or glycols. The use of water is particularly preferred.

The polymerization can be carried out at temperatures from 20 to 300, preferably from 60 to 200° C. Depending on the choice of polymerization conditions, it is possible to obtain weight average molecular weights for example within the range from 800 to 5,000,000, especially from 1,000 to 1,000,000. The weight average molecular weights $M_w$ are preferably above 15,000. Weight average molecular weights from 15,000 to 600,000 are particular preferred. $M_w$ is determined by gel permeation chromatography (detailed description in Examples).

The polymerization is preferably carried out in the presence of compounds forming free radicals. These compounds are required in an amount of up to 30, preferably 0.05 to 15, particularly preferably from 0.2 to 8,% by weight, based on the monomers used in the polymerization. In the case of multicomponent initiator systems (eg. redox initiator systems), the foregoing weights are based on the sum total of the components.

Examples of suitable polymerization initiators are peroxides, hydroperoxides, peroxodisulfates, percarbonates, peroxyesters, hydrogen peroxide and azo compounds. Examples of initiators which can be water-soluble or else water-insoluble are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumene hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfate, azodiisobutyronitrile, 2,2'-azobis(2-amidinopropane) dihydrochloride, 2-(carbamoylazo)isobutyronitrile and 4,4-azobis(4-cyanovaleric acid).

The initiators can be used alone or mixed with each or one another, for example mixtures of hydrogen peroxide and sodium peroxodisulfate. The polymerization in aqueous medium is preferably carried out using water-soluble initiators.

It is equally possible to use the known redox initiator systems as polymerization initiators. Such redox initiator systems include at least one peroxide-containing compound combined with a redox coinitiator, for example reducing sulfur compounds, for example bisulfites, sulfites, thiosulfates, dithionites and tetrathionates of alkali metals and ammonium compounds. For instance, combinations of peroxodisulfates with alkali metal or ammonium bisulfites can be used, for example ammonium peroxodisulfate and ammonium disulfite. The ratio of peroxide-containing compound to redox coinitiator is within the range from 30:1 to 0.05:1.

The initiators or redox initiator systems can be combined with transition metal catalysts, for example salts of iron, cobalt, nickel, copper, vanadium and manganese. Examples of suitable salts are iron(II) sulfate, cobalt(II) chloride, nickel(II) sulfate, copper(I) chloride. Based on monomers, the reducing transition metal salt is used in a concentration of from 0.1 ppm to 1,000 ppm. For instance, combinations of hydrogen peroxide with iron(II) salts can be used, for example 0.5 to 30% of hydrogen peroxide with 0.1 to 500 ppm of Mohr's salt.

Similarly, a polymerization in organic solvents can be carried out using the abovementioned initiators combined with redox coinitiators and/or transition metal catalysts, for example benzoin, dimethylaniline, ascorbic acid combined with solvent-soluble complexes of heavy metals, such as copper, cobalt, iron, manganese, nickel and chromium. The amounts of redox coinitiators or transition metal catalysts customarily used here customarily range from about 0.1 to 1,000 ppm, based on the amounts of the monomers used.

If the polymerization of the reaction mixture is started at the lower limit of a suitable temperature range for the polymerization and subsequently completed at a higher temperature, it is advantageous to use at least two different initiators which decompose at different temperatures, so that a sufficient concentration of free radicals is available within every temperature interval.

To prepare polymers having a low average molecular weight it is frequently advantageous to carry out the copolymerization in the presence of regulators. Customary regulators can be used for this, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$–$C_4$-aldehydes, such as formaldehyde, acetaldehyde, propionaldehyde, hydroxylammonium salts such as hydroxylammonium sulfate, formic acid, sodium bisulfite or isopropanol. The polymerization regulators are generally used in amounts from 0.1 to 10% by weight, based on the monomers. The average molecular weight can also be influenced by the choice of solvent. For instance, a polymerization in the presence of diluents having benzylic hydrogen atoms leads to a reduced average molecular weight due to chain transfer.

To prepare higher molecular weight copolymers it is frequently advantageous to carry out the polymerization in the presence of crosslinkers. Such crosslinkers are compounds having two or more ethylenically unsaturated groups, for example diacrylates or dimethacrylates of at least dihydric saturated alcohols, eg. ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. Similarly the acrylic and methacrylic esters of alcohols having more than 2 OH groups can be used as crosslinkers, eg. trimethylolpropane triacrylate or trimethylolpropane trimethacrylate. A further class of crosslinkers are diacrylates or dimethacrylates of polyethylene glycols or polypropylene glycols having molecular weights from 200 to 9 000 in each case. Polyethylene glycols and polypropylene glycols used for preparing the diacrylates or dimethacrylates preferably have a molecular weight of from 400 to 2 000 in each case. As well as the homopolymers of ethylene oxide and propylene oxide it is also possible to use block copolymers of ethylene oxide and propylene oxide or copolymers of ethylene oxide and propylene oxide containing the ethylene oxide and propylene oxide units in random distribution. The oligomers of ethylene oxide or propylene oxide are also suitable for preparing the crosslinkers, eg. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Suitable crosslinkers further include vinyl acrylate, vinyl methacrylate, vinyl itaconate, divinyl adipate, butanediol divinyl ether, trimethylolpropane trivinyl ether, allyl acrylate, allyl methacrylate, pentaerythritol triallyl ether, triallylsucrose, pentaallylsucrose, pentaallylsaccharose, methylenebis(meth)acrylamide, divinylethyleneurea, divinylpropyleneurea, divinylbenzene, divinyldioxane, triallyl cyanurate, tetraallylsilane, tetravinylsilane and bis- or polyacryloylsiloxanes (eg. Tegomers® from Th. Goldschmidt AG). The crosslinkers are preferably used in amounts from 10 ppm to 5% by weight, based on the monomers to be polymerized.

If the method of emulsion, precipitation, suspension or dispersion polymerization is used, it can be advantageous to stabilize the polymer droplets or particles by means of interface-active auxiliaries. Typically these are emulsifiers or protective colloids. Emulsifiers used can be anionic, nonionic, cationic or amphoteric. Examples of anionic emulsifiers are alkylbenzenesulfonic acids, sulfonated fatty acids, sulfosuccinates, fatty alcohol sulfates, alkylphenol sulfates and fatty alcohol ether sulfates. Examples of usable nonionic emulsifiers are alkylphenol ethoxylates, primary alcohol ethoxylates, fatty acid ethoxylates, alkanolamide ethoxylates, fatty amine ethoxylates, EO/PO block copolymers and alkylpolyglucosides. Examples of cationic and amphoteric emulsifiers used are quaternized amine alkoxylates, alkylbetaines, alkylamidobetaines and sulfobetaines.

Examples of typical protective colloids are cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and maleic acid or anhydride copolymers as described for example in DE 2 501 123.

The emulsifiers or protective colloids are customarily used in concentrations from 0.05 to 20% by weight, based on the monomers.

If the polymerization is carried out in aqueous solution or dilution, the monomers can be wholly or partly neutralized with bases before or during the polymerization. Examples of suitable bases are alkali metal and alkaline earth metal compounds such as sodium hydroxide, potassium hydroxide, calcium hydroxide, magnesium oxide, sodium carbonate; ammonia; primary, secondary and tertiary amines, such as ethylamine, propylamine, monoisopropylamine, monobutylamine, hexylamine, ethanolamine, dimethylamine, diethylamine, di-n-propylamine, tributylamine, triethanolamine, dimethoxyethylamine, 2-ethoxyethylamine, 3-ethoxypropylamine, dimethylethanolamine, diisopropanolamine and morpholine.

Polybasic [sic] amines can also be used for neutralization, for example ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine.

Ammonia, triethanolamine and diethanolamine are preferred for partially or completely neutralizing the ethylenically unsaturated carboxylic acids before or during the polymerization.

The ethylenically unsaturated carboxylic acids are particularly preferably not neutralized before and during the polymerization. It is similarly preferred not to add a neutralizing agent after the polymerization either, apart from alkanolamine B). The polymerization can be carried out continuously or batchwise according to a multiplicity of variants. It is customary to introduce part of the monomers as initial charge, if necessary in a suitable diluent or solvent and in the absence or presence of an emulsifier, a protective colloid or further assistants, to provide a blanket of an inert gas, and to raise the temperature until the desired polymerization temperature is achieved. However, the initial charge may also be a suitable diluent alone. The free-radical initiator, further monomers and other assistants, for example regulators or crosslinkers, each in a diluent, if necessary, are metered in over a defined period. The addition times may differ in length. For example, the initiator may be added over a longer period than the monomer.

If the polymer is obtained in water following a solution polymerization, there is usually no need to separate off the solvent. If it is nonetheless desired to isolate the polymer, this can be done by spray drying, for example.

If the polymer is prepared by the method of solution, precipitation or suspension polymerization in a solvent or solvent mixture which is volatile in steam, the solvent can be removed by introducing steam into the reaction mixture in order that an aqueous solution or dispersion may be obtained in this way. The polymer can also be separated from the organic diluent by a drying process.

Polymers A) are preferably present in the form of an aqueous dispersion or solution having solids contents from preferably 10 to 80%, in particular from 40 to 65%, by weight.

Polymer A) can also be obtained by grafting maleic acid or maleic anhydride or a monomer mixture comprising maleic acid or maleic anhydride onto a grafting base. Examples of suitable grafting bases are monosaccharides, oligosaccharides, modified polysaccharides and alkylpolyglycol ethers. Such graft polymers are described for example in DE 4 003 172 and EP 116 930.

Component B) comprises alkanolamines having at least two OH groups. Preference is given to alkanolamines of the formula

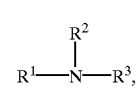

I where $R^1$ is hydrogen, $C_1$–$C_{10}$-alkyl or $C_1$–$C_{10}$-hydroxyalkyl and $R^2$ and $R^3$ are each $C_1$–$C_{10}$-hydroxyalkyl.

It is particularly preferable for $R^2$ and $R^3$ to be independently of each other $C_2$–$C_5$-hydroxyalkyl and $R^1$ to be hydrogen, $C_1$–$C_5$-alkyl or $C_2$–$C_5$-hydroxyalkyl.

Examples of suitable compounds of the formula I are diethanolamine, triethanolamine, diisopropanolamine, triisopropanolamine, methyldiethanolamine, butyldiethanolamine and methyldiisopropanolamine. Triethanolamine is particularly preferred.

The formaldehyde-free binders of this invention are preferably prepared by using polymer A) and alkanolamine B) in such a relative ratio that the molar ratio of carboxyl groups of component A) to the hydroxyl groups of component B) is within the range from 20:1 to 1:1, preferably within the range from 8:1 to 5:1, particularly preferably within the range from 5:1 to 1.7:1 (anhydride groups are here calculated as 2 carboxyl groups).

The formaldehyde-free aqueous binders of this invention are prepared for example simply by adding the alkanolamine to the aqueous dispersion or solution of polymer A).

The binders of this invention preferably include less than 1.0% by weight, particularly preferably less than 0.5% by weight, very particularly preferably less than 0.3% by weight, especially less than 0.1% by weight, based on the sum of A)+B), of a phosphorus-containing reaction accelerant. Phosphorus-containing reaction accelerants are mentioned in U.S. Pat. No. 651 088 and U.S. Pat. No. 583 086. They are in particular alkali metal hypophosphites, phosphites, polyphosphates, dihydrogenphosphates, polyphosphoric acid, hypophosphoric acid, phosphoric acid, alkylphosphinic acid and oligomers and polymers of these salts and acids.

The binders of this invention preferably include no phosphorus-containing reaction accelerants, or amounts of a phosphorus-containing compound effective for reaction acceleration. The binders of this invention may include an esterification catalyst, for example sulfuric acid or p-toluenesulfonic acid. The binders of this invention can be used as impregnants or coatings. The binders of this invention can be the sole constituent of said impregnants or coatings. However, the impregnants or coatings may additionally include further additives suitable for the particular intended use. Examples of suitable additives are dyes, pigments, biocides, plasticizers, thickeners, adhesion improvers, reductants and transesterification catalysts.

The binders of this invention dry at 50° C. in 72 hours to a film from 0.3 to 1 mm in thickness and following a subsequent 15 minutes' cure at 130° C. in air preferably have a gel content of above 50% by weight, particularly preferably of above 60% by weight, very particularly preferably above 70% by weight, in particular above 75% by weight.

After curing, the cured films are stored at 23° C. in water for 48 hours. Solubles remain in the water. The film is then dried at 50° C. to constant weight and weighed. The weight corresponds to the gel content, the gel content is calculated in % by weight, based on the weight before the solubles are separated off. Constant weight is achieved when the weight decrease over 3 hours is less than 0.5, in particular less than 0.1% by weight.

The binders of this invention are particularly useful as binders for fiber webs. Examples of fiber webs are webs of cellulose, cellulose acetate, esters and ethers of cellulose, cotton, hemp, animal fibers, such as wool or hairs and especially webs of synthetic or inorganic fibers, eg. aramid, carbon, acrylic, polyester, mineral, PVC or glass fibers.

If used as binders for fiber webs, the binders of this invention can include the following additives for example: silicates, silicones, boron-containing compounds, lubricants, wetting agents.

Glass fiber webs are preferred. The binder of this invention has the effect of converting unbonded fiber webs, especially of glass fibers, into consolidated or bonded webs.

For this the binder of this invention is applied to the unbonded web, for example by coating, impregnating, saturating, preferably in a weight ratio of fiber/polymer A (solid) of from 10:1 to 1:1, particularly preferably from 6:1 to 3:1.

The binder of this invention is preferably used for this in the form of an aqueous dilute preparation having a water content of from 95 to 40% by weight.

After the binder of this invention has been applied to the web, it is generally dried preferably at from 100 to 400, especially at from 130 to 280° C., very particularly preferably at from 130 to 230° C., for a period of preferably from 10 seconds to 10 minutes, especially from a period within the range from 10 seconds to 3 minutes.

The resulting bonded fiber web has high strength dry and wet. After drying, the bonded fiber web does not show any significant yellowing, if any. The binders of this invention provide in particular short drying times and also low drying temperatures.

The bonded fiber webs, especially glass fiber webs, are useful as or in roofing membranes, as loadbearing materials for wallpapers or as inliners or loadbearing materials for floor coverings, for example PVC floor coverings. PVC floor coverings manufactured using glass fiber webs consolidated using the binders of this invention and PVC plastisols have little if any tendency to yellow.

When used as roofing membranes, the bonded fiber webs are generally coated with bitumen.

The binders of this invention can also be used in admixture with further binders, for example formaldehyde-containing binders such as urea-formaldehyde resins, melamine-formaldehyde resins or phenol-formaldehyde resins.

The binders of this invention can further be used as binders for insulating materials composed of the abovementioned fibers, especially inorganic fibers such as mineral fibers and glass fibers.

The hitherto customary binders based on phenol-formaldehyde condensation resins have the disadvantage that significant amounts of phenol, formaldehyde and low molecular weight condensation products thereof are emitted in vapor form during the manufacture of insulating materials. Costly measures have to be taken to prevent their escape to the environment. Furthermore, the finished insulating products can emit formaldehyde, which is particularly undesirable when the insulating products are used in residential buildings.

Fibers for insulating materials are widely produced in industry by spinning melts of the corresponding mineral raw materials (see for example EP 567 480).

In the manufacture of insulating materials, the aqueous binder solution is preferably sprayed onto the freshly prepared fibers while they are still hot. Most of the water evaporates, leaving the resin as a viscous high-solids material adhering to the fibers in an essentially uncured state. The fibers are then used to produce binder-containing fiber mats and these are further transported by suitable conveyor belts through a curing oven. There the resin cures at oven temperatures of from about 150 to 350° C. to form a stiff, thermoset matrix. After curing, the mats of insulating material are suitably finished, ie. cut into a shape suitable for the end-user.

The binders used in the manufacture of insulating materials may include customary auxiliary and additive substances. Examples thereof are hydrophobicizing agents, for example silicone oils, alkoxysilanes such as 3-aminopropyltriethoxysilane as coupling agent, soluble or emulsifiable oils as lubricants and dustproofing agents and also wetting aids.

The predominant proportion of the mineral or glass fibers used in the insulating materials have a diameter within the range from 0.5 to 20 $\mu$m and a length within the range from 0.5 to 10 cm.

Customary use-forms for insulating materials are rectangular or triangular sheets and rolled-up webs. The thickness and density of the insulating materials can be varied within wide limits, making it possible to produce products having the desired insulating effect. Customary thicknesses range from 1 to 20 cm, customary densities from 20 to 300 kg/m$^3$. The insulating effect is characterized by the thermal conductivity lambda (in mw/m°K). The insulating sheets have dry and wet strength.

The binders of this invention are also useful for manufacturing saucepan cleaners or scourers based on bonded fiber webs. Fibers can be natural fibers and synthetic fibers, especially on [sic] mineral fibers or glass fibers. Fiber webs for saucepan cleaners or scourers are preferably consolidated using the spraying process.

EXAMPLES

Preparation of aqueous binders

The polymer solutions were mixed with triethanolamine (TEA) in the respective amounts indicated in Table 1, which also shows the solids content of the binder, the pH and the viscosity.

TABLE 1

| Binder | Polymer [g] | TEA [g] | Solids content [%] | pH | Viscosity [mPas] |
|---|---|---|---|---|---|
| A | 882.0 Cop. AA/MA[1] 80:20 | 117.2 | 49.4 | 2.9 | 7,100 |
| B | 875.0 Cop. AA/MA[2] 85:15 | 125.0 | 46.8 | 3.2 | 5,400 |
| C | 882.0 Cop. AA/MA[3] 75:25 | 118.0 | 49.4 | 2.9 | 3,700 |
| D | 891.9 Cop. AA/MA[4] 90:10 | 108.1 | 45.1 | 3.3 | 4,900 |
| E | 894.8 Cop. AA/MA[5] 70:30 | 105.2 | 44.0 | 2.8 | 2,800 |
| F | 884.3 Cop. AA/MA[6] 60:40 | 115.7 | 48.5 | 2.3 | 800 |
| G | 881.5 Cop. AA/MA[7] 80:20 | 118.5 | 50.8 | 3.0 | 2,400 |
| H | 880.1 Cop. AA/MA[8] 70:30 | 119.9 | 50.2 | 2.9 | 900 |
| I | 886.7 Cop. AA/MA[9] 60:40 | 113.3 | 46.4 | 2.5 | 440 |
| K | 928.2 EMA[10] | 71.8 | 29.9 | 3.3 | 10,800 |
| L | 925.3 MA anhydride/V1[11] | 74.7 | 30.8 | 3.2 | 14,200 |
| M | 924.7 Cop. AA/MA[12] 70:30 | 75.3 | 43.7 | 3.7 | 2,700 |
| N | 891.2 Cop. AA/MA[13] 70:30 | 108.8 | 45.4 | 2.9 | 2,400 |
| O | 860.3 Cop. AA/MA[14] 70:30 | 139.7 | 47.5 | 2.4 | 2,300 |
| P | 905.0 Poly-AA[15] | 95.0 | 40.4 | 3.5 | 2,100 |
| Q | 928.2 Cop. MAA/AA[16] | 71.8 | 29.9 | 3.0 | 280 |

Abbreviations
AA: Acrylic acid
EMA: Ethylene/maleic acid copolymer
SC: Solids content
MAA: Methacrylic acid
MA: Maleic acid
$M_w$: weight average molecular weight
TEA: Triethanolamine
V1: Methyl vinyl ether

[1]: Copolymer of acrylic acid/maleic acid 80:20 % by weight, $M_w$ 160,000, polymerized at 110° C. with hydrogen peroxide as free-radical initiator, as per EP 75 820. SC: 44.5%, pH: 0.8
[2]: Preparation similar to copolymer 1, SC: 40.5%, pH: 1.1, $M_w$: 240,000
[3]: Preparation similar to copolymer 1, SC: 44.6%, pH: 0.7, $M_w$: 90,000
[4]: Preparation similar to copolymer 1, SC: 40.4%, pH: 1.1, $M_w$: 205,000
[5]: Preparation similar to copolymer 1, SC: 39.2%, pH: 2.7, $M_w$: 84,000
[6]: Preparation similar to copolymer 1, Mw: SC: 43.6%, pH: 1.0, $M_w$: 25,000
[7]: polymerized at 130° C. with hydrogen peroxide as free-radical initiator as per EP 75 820. SC: 44.8%, pH: 0.8, $M_w$: 80,000
[8]: polymerized at 130° C. with hydrogen peroxide as free-radical initiator as per EP 75 820. SC: 45.4%, pH: 1.4, $M_w$: 27,000
[9]: polymerized at 130° C. with hydrogen peroxide as free-radical initiator as per EP 75 820. SC: 42.6%, pH: 0.7, $M_w$: 15,000
[10]: Mw: 820,000, SC: 21.6, pH: 4.6

TABLE 1-continued

| Binder | Polymer [g] | TEA [g] | Solids content [%] | pH | Viscosity [mPas] |
|---|---|---|---|---|---|

[11]: Mw: 1000,000, SC: 23.5, pH: 5.1
[12]: Preparation similar to copolymer 5, SC: 40.7%, pH: 2.5, $M_w$: 80,000
[13]: Preparation similar to copolymer 5, SC: 40.7%, pH: 2.5, $M_w$: 80,000
[14]: Preparation similar to copolymer 5, SC: 40.7%, pH: 2.5, $M_w$: 80,000
[15]: Polyacrylic acid, Mw: 100,000, SC: 35.0%, pH: 1.0, for comparison
[16]: Copolymer of acrylic acid/methacrylic acid 30:70 % by weight, Mw: 22,000, SC: 25.8%, pH: 1.4, for comparison.

Determination of average molecular weight:

The weight average molecular weight was determined by gel permeation chromatography (GPC) using aqueous eluents. The system was calibrated with a broadly distributed sodium polyacrylate mixture, whose cumulative molecular weight distribution curve had been determined by coupled GPC laser light scattering, according to the calibration method of M. J. R. Cantow et al. (J. Polym. Sci., A-1,5 (1967) 1391–1394), albeit without the concentration correction suggested there. The eluent used was an aqueous tris(hydroxymethyl)aminomethane (TRIS) buffer solution (0.08 molar). The chromatography columns were loaded with TSK PW-XL 3000 and TSK PW-XL 5000 (from TosoHaas) as stationary phase. A differential refractometer was used for detection.

Determination of the solids content:

A defined amount of the sample is weighed (starting weight) into an aluminum dish. The sample is dried in a drying cabinet at 50° C. for 72 hours. The sample is then reweighed (final weight). The percentage solids content SC is calculated as follows: SC=final weight×100/starting weight [%].

Determination of the viscosity:

The solution viscosity was determined using an LVF viscometer from Brookfield. The samples were conditioned to 23° C. beforehand.

Application tests

Glass fiber webs

Binder solutions A to Q were diluted with water to a total solids content of 15% by weight and introduced into an impregnating trough. The web used was a glass fiber web 26.5×32.5 cm in size which had been lightly prebonded with melamine-formaldehyde resins (about 7% of binder add-on, basis weight about 50 g/m²). After 2×20 sec dips into the impregnating liquor, the excess binder was sucked off to achieve a binder content of 20% (based on the total weight) and the impregnated glass web was dried in a Mathis oven for a predetermined time (t) at the temperature setting (T) (see Table 2). The glass fiber sheet was cut into strips 50 mm in width which were stretched in a tensile tester at 50 mm/min to the point of rupture (dry breaking strength BS). The temperature of the fiber web is reported in Table 2. To measure the wet strength, corresponding test-strips were placed in water at 25 or 80° C. for 15 min and then stretched to rupture in the moist state at the stated temperature (wet BS). The results of the measurements (averages of 5 specimens) are reported in newtons (N) and are based on a test-strip width of 50 mm.

To determine the boil-off loss (BOL) the decrease in the web weight after 15 min of boiling in distilled water was determined.

Yellowing was assessed qualitatively.

The results are shown in Table 2.

A Fischer bar thus prepared is tested in the dry state at 23° C. in a three-point bending test. In this bending test, the test specimen rests on 2 points and is subjected to a force in the middle until it breaks (bending strength = breaking force divided by cross-sectional area).

TABLE 2

| Example No. | Binder | Drying temp. [° C.] | Drying time [sec.] | Dry BS at 25° C. [N] | Wet BS at 25° C. [N] | Wet BS at 80° C. [N] | Dry BS at 180° C. [N] | BOL [%] | Yellowing |
|---|---|---|---|---|---|---|---|---|---|
| 17 | A | 180 | 25 | 188 | 78 | 45 | 143 | 3.9 | none |
| 18 | A | 180 | 30 | 184 | 88 | 46 | 139 | 2.5 | none |
| 19 | A | 180 | 60 | 207 | 165 | 89 | 159 | 1.4 | none |
| 20 | A | 180 | 90 | 210 | 176 | 114 | 130 | 1.1 | none |
| 21 | A | 180 | 120 | 202 | 186 | 130 | 154 | 0.5 | none |
| 22 | B | 180 | 120 | 197 | 187 | 119 | 153 | 1.1 | none |
| 23 | C | 180 | 120 | 189 | 180 | 125 | 157 | 0.8 | none |
| 24 | D | 180 | 120 | 202 | 168 | 122 | 152 | 0.9 | none |
| 25 | E | 180 | 120 | 205 | 185 | 135 | 149 | 1.5 | none |
| 26 | F | 180 | 120 | 188 | 184 | 127 | 139 | 1.9 | none |
| 27 | G | 180 | 120 | 207 | 168 | 116 | 160 | 1.2 | none |
| 28 | G | 200 | 120 | 181 | 181 | 140 | 146 | 0.6 | yes |
| 29 | H | 180 | 120 | 197 | 165 | 128 | 131 | 2.7 | none |
| 30 | H | 200 | 120 | 198 | 175 | 145 | 129 | 0.8 | yes |
| 31 | I | 180 | 120 | 188 | 155 | 101 | 132 | 1.8 | none |
| 32 | K | 180 | 120 | 220 | 186 | 130 | 150 | 0.5 | none |
| 33 | L | 180 | 120 | 223 | 194 | 74 | 142 | 1.3 | yes |
| 34 | M | 180 | 120 | 196 | 187 | 89 | 152 | 1.2 | none |
| 35 | N | 180 | 120 | 195 | 194 | 132 | 146 | 1.4 | none |
| 36 | O | 180 | 120 | 199 | 174 | 114 | 141 | 1.5 | none |
| 37 | P | 180 | 120 | 191 | 108 | 62 | 127 | 2.6 | none |
| 38 | Q | 180 | 20 | 147 | 61 | 48 | 158 | 16.0 | none |
| 39 | Q | 180 | 30 | 145 | 63 | 46 | 166 | 17.0 | none |
| 40 | Q | 180 | 60 | 162 | 88 | 61 | 162 | 2.8 | none |
| 41 | Q | 180 | 90 | 170 | 105 | 74 | 161 | 1.5 | none |
| 42 | Q | 180 | 120 | 176 | 126 | 80 | 156 | 2.0 | none |
| 43 | Q | 200 | 120 | 187 | 167 | 144 | 158 | 1.3 | yes |

Examples 37 to 43 are comparative

Determination of gel content

Binder R:

| 150 g | of an 80AA/20 MA copolymer (copolymer 1) and |
| 30 g | of triethanolamine were added together. |

The mixture is poured into a silicone mold and dried at 50° C. in a through-circulation oven. The thickness of the resulting film is within the range from 0.5 to 1 mm.

About 1 g of the film thus prepared is cured at 130° C. for 15 min. The cured film is stored in distilled water at 23° C. for 48 h.

The gel content is the ratio of the weight of the water-stored film after drying back to constant weight to the original weight of the film.

Gel content: 83%

Insulating materials

Example 44

Preparation of a test specimen from fused basalt beads using binder R 300 g of fused basalt powder beads are mixed with 30.6 g of binder R. The mixture is molded into a test specimen (Fischer bar) having the dimensions of 17×2.3×2.3 cm and cured at 200° C. for 2 h.

Dry bending strength: 740 N/mm$^2$

A further Fischer bar is stored in distilled water at 23° C. for one hour. The water taken up by the test specimen and its bending strength in the wet state at 23° C. are determined.

Water uptake: 21.7% by weight

Wet bending strength: 620 N/mm$^2$

Example 45

(for comparison)

Example 44 was repeated using a commercial phenol-formaldehyde resin (Kauresin® 259 liquid) instead of binder R.

Dry bending strength: 850 N/mm$^2$

Water uptake: 22% by weight

Wet bending strength: 690 N/mm$^2$

We claim:

1. A process for producing fiber webs, which comprises using formaldehyde-free aqueous binders comprising:
    A) a free-radically polymerized polymer containing from 5 to 100% by weight of units derived from an ethylenically unsaturated acid anhydride or from an ethylenically unsaturated dicarboxylic acid whose carboxyl groups can form an anhydride group, and
    B) an alkanolamine having at least two hydroxyl groups, wherein the aqueous binder comprises less than 0.5% by weight, based on the sum of A)+B), of a phosphorus-containing reaction accelerant, as binders for the fiber webs.

2. A process as claimed in claim 1, wherein the binder comprises less than 0.3% by weight of a phosphorus-containing reaction accelerant.

3. A process as claimed in claim 1, wherein the binder has a gel content greater than 50% by weight following 15 minutes drying at 130° C.

4. A process as claimed in claim 1, wherein the polymer contains from 5 to 100% by weight of units derived from maleic acid or maleic anhydride.

5. A process as claimed in claim 1, wherein the alkanolamine is a compound represented by formula (I):

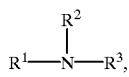

I wherein

R$^1$ is hydrogen, C$_1$–C$_{10}$-alkyl or C$_1$–C$_{10}$-hydroxyalkyl, and

R$^2$ and R$^3$ are each C$_1$–C$_{10}$-hydroxyalkyl.

6. A process as claimed in claim 1, wherein the alkanolamine is triethanolamine.

7. A process as claimed in claim 1, wherein the molar ratio of the carboxyl groups and anhydride groups (1 anhydride group calculated as 2 carboxyl groups) of A) to the hydroxyl groups of B) is within the range from 20:1 to 1:1.

8. A process for producing bonded fiber webs, which comprises coating or impregnating fiber webs with an aqueous binder as claimed in claim 1 and drying.

9. A process as claimed in claim 1 for producing bonded glass fiber webs.

10. Bonded fiber webs obtained by using a formaldehyde-free aqueous binder as claimed in claim 1.

11. Bonded glass fiber webs obtained by using a formaldehyde-free aqueous binder as claimed in claim 1.

12. Roofing membranes comprising bonded fiber webs as claimed in claim 10.

13. Roofing membranes comprising bonded glass fiber webs as claimed in claim 11.

14. Insulating materials comprising bonded fiber webs as claimed in claim 10.

15. Insulating materials comprising bonded glass fiber webs as claimed in claim 11.

16. Floor coverings comprising bonded fiber webs as claimed in claim 10.

17. Floor coverings comprising bonded glass fiber webs as claimed in claim 11.

18. Saucepan cleaners comprising bonded fiber webs as claimed in claim 10.

19. A formaldehyde-free aqueous binder, comprising:

A) a free-radically polymerized polymer which contains from 5 to 100% by weight of units derived from an ethylenically unsaturated acid anhydride or from an ethylenically unsaturated dicarboxylic acid whose carboxyl groups can form an anhydride group, and B) an alkanolamine having at least two hydroxyl groups, wherein the aqueous binder comprises less than 0.5% by weight, based on the sum of A)+B), of a phosphorus-containing reaction accelerant, and wherein the binder dries at 50° C. in 72 hours to a film from 0.3 to 1 mm in thickness and, following a subsequent 15 minutes cure at 130° C. in air, has a gel content of above 50% by weight.

20. A process as claimed in claim 1, wherein the aqueous binder comprises less than 0.3% by weight, based on the sum of A)+B), of a phosphorus-containing reason accelerant.

21. A process as claimed in claim 1, wherein the aqueous binder comprises less than 0.1% by weight, based on the sum of A)+B), of a phosphorus-containing reaction accelerant.

22. A formaldehyde-free aqueous binder as claimed in claim 19, comprising less than 0.3% by weight, based on the sum of A)+B), of a phosphorus-containing reaction accelerant.

23. A formaldehyde-free aqueous binder as claimed in claim 19, comprising less than 0.1% by weight, based on the sum of A)+B), of a phosphorus-containing reaction accelerant.

24. A process as claimed in claim 1, wherein the alkanolamine is a tri-(hydroxy-C$_{1-10}$-alkyl)amine.

25. A formaldehyde-free aqueous binder as claimed in claim 19, wherein the alkanolamine is a tri-(hydroxy-C$_{1-10}$-alkyl)amine.

26. Bonded fiber webs bonded by using a formaldehyde-free aqueous binder as obtained by the process of claim 20.

27. Bonded fiber webs bonded by using a formaldehyde-free aqueous binder obtained by the process of claim 21.

28. Bonded fiber webs obtained by using the formaldehyde-free aqueous binder as claimed in claim 19.

29. Bonded fiber webs obtained by using the formaldehyde-free aqueous binder as claimed in claim 25.

* * * * *